US008294835B2

(12) United States Patent
Ichikawa

(10) Patent No.: US 8,294,835 B2
(45) Date of Patent: Oct. 23, 2012

(54) STAGE APPARATUS AND CONTROL METHOD FOR STAGE APPARATUS

(75) Inventor: Kuniyoshi Ichikawa, Kita-ku (JP)

(73) Assignee: Next One Create, Ltd., Tokyo (JP)

( * ) Notice: Subject to any disclaimer, the term of this patent is extended or adjusted under 35 U.S.C. 154(b) by 497 days.

(21) Appl. No.: 12/588,646

(22) Filed: Oct. 22, 2009

(65) Prior Publication Data

US 2010/0110315 A1 May 6, 2010

(30) Foreign Application Priority Data

Oct. 31, 2008 (JP) ................................ 2008-282394

(51) Int. Cl.
*H04N 5/64* (2006.01)

(52) U.S. Cl. ........ 348/840; 348/838; 348/839; 348/836; 348/843

(58) Field of Classification Search .................. 348/840, 348/838, 839, 836, 843
See application file for complete search history.

(56) References Cited

U.S. PATENT DOCUMENTS 4,962,420 A * 10/1990 Judenich ........................ 348/744
5,920,476 A * 7/1999 Hennessey et al. ............. 700/17
6,834,465 B2 12/2004 Hoberman

FOREIGN PATENT DOCUMENTS

| | | |
|---|---|---|
| JP | A-63-503350 | 12/1988 |
| JP | U-4-28000 | 3/1992 |
| JP | A-11-210248 | 8/1999 |
| JP | A-2000-508222 | 7/2000 |
| JP | A-2008-93014 | 4/2008 |
| WO | WO 98/25197 | 6/1998 |

OTHER PUBLICATIONS

Jan. 27, 2010 Search Report issued in British Patent Application No. 0918887.1.

* cited by examiner

*Primary Examiner* — Shawn An
(74) *Attorney, Agent, or Firm* — Oliff & Berridge, PLC

(57) ABSTRACT

Provided is a stage apparatus and a control method for the stage apparatus capable of increasing a degree of freedom in terms of movement of a display part, and diversifying stage presentation in which the display part is utilized. A plurality of display parts (31) display video. At least one supporting member (32) supports the display part (31). A control part controls a position of the display part (31) such that the plurality of display parts (31) are moved to have a predetermined positional relation with respect to one another.

7 Claims, 9 Drawing Sheets

STAGE APPARATUS AND CONTROL METHOD FOR STAGE APPARATUS

CROSS-REFERENCE TO RELATED APPLICATION

The present application claims priority from Japanese application JP 2008-282394 filed on Oct. 31, 2008, the content of which is hereby incorporated by reference into this application.

BACKGROUND OF THE INVENTION

1. Field of the Invention

The present invention relates to a stage apparatus and a control method for the stage apparatus.

2. Description of the Related Art

In recent years, in performing arts including a concert and a play held in a stadium and a stage, renditions are performed in variety of styles. For example, there are performed such a rendition that an audience can see performers playing, singing, acting, etc. even in a place away from the stage by projecting the performers in close up in a display part such as a screen and a display provided on the stage, and such a rendition that variety of video and images are displayed in the display part.

In conventional performing arts, it is difficult to move the display part such as the screen and the display during performance. Specifically, for example, a direction in which the display part can be moved is limited to a specific direction (for example, direction along an edge of the stage). Therefore, a limitation is imposed on stage presentation in which the display part is utilized, and thus it is difficult to perform an unexpected rendition for the audience. In this context, if a degree of freedom in terms of movement of the display part can be increased, it is possible to diversify stage presentation, and to realize the unexpected rendition for the audience.

SUMMARY OF THE INVENTION

The present invention has been made in view of the above-mentioned circumstances, and an object of the present invention is therefore to provide a stage apparatus and a control method for the stage apparatus capable of increasing a degree of freedom in terms of movement of a display part, and diversifying stage presentation in which the display part is utilized.

In order to achieve the above-mentioned object, a stage apparatus according to the present invention includes: a plurality of display parts for displaying video; at least one supporting member for supporting the display part; and a position controlling means for controlling a position of the display part such that the plurality of display parts are moved to have a predetermined positional relation with respect to one another.

According to the present invention, the position of the display part is controlled such that the plurality of display parts are moved to have the predetermined positional relation with respect to one another. Therefore, it is possible to increase a degree of freedom in terms of movement of the display parts, and diversify stage presentation in which the display parts are utilized.

According to one aspect of the present invention, when receiving operation performed by a user, the position controlling means controls the position of the display part in accordance with the operation. In this way, the position of the display part can be controlled based on the operation performed by the user, and hence it is possible to control the position of the display part at timing required by the user.

Further, according to another aspect of the present invention, the position controlling means turns the display part. In this way, the display part is turned, and hence it is possible to further increase the degree of freedom in terms of the movement of the display parts, and further diversify the stage presentation.

Further, according to still another aspect of the present invention, the position controlling means moves the display part in a direction corresponding to a direction perpendicular to a surface of the display part. In this way, the display part is moved in the direction corresponding to the direction perpendicular to the surface thereof, and hence it is possible to further increase the degree of freedom in terms of the movement of the display parts, and further diversify the stage presentation.

Further, according to still another aspect of the present invention, the at least one supporting member and the plurality of display parts correspond to each other in terms of numbers. In the at least one supporting member, one end of the supporting member is jointed to the display part corresponding to the supporting member, and another end of the supporting member is jointed to a stage. In this way, the supporting member corresponding to the display part is jointed to the stage, and thus the stage apparatus can be configured.

Further, according to still another aspect of the present invention, a platform allowing a performer for performing arts to get on and off is jointed to the display part, the stage apparatus being used in the performing arts. In this way, it is possible to move a position of the performer along with change of the position of the display part.

Further, according to still another aspect of the present invention, the stage apparatus further includes a video controlling means for displaying the video in the display part, in which: the supporting member extends from the stage to support the display part from a back surface thereof; the supporting member includes a pillar portion, a first joint portion provided at a forward end portion of the pillar portion, for turnably jointing the display part to the pillar portion, and a second joint portion provided at a proximal end portion of the pillar portion, for turnably jointing the pillar portion; the position controlling means controls an angle between the pillar portion jointed to the first joint portion and the display part jointed to the first joint portion such that the display part is turned in a first direction with respect to the pillar portion, the angle being calculated based on the position of the display part; the position controlling means controls an angle between members jointed to the second joint portion such that the pillar portion is turned in a second direction different from the first direction, the angle being calculated based on the position of the display part; the position controlling means controls the position of the display part such that a first arrangement is achieved, in which a first display part and a second display part among the plurality of display parts are aligned with each other; the position controlling means controls the position of the display part such that a second arrangement is achieved, in which the first display part and the second display part are out of alignment; the video controlling means causes the first display part to display one part of predetermined video while causing the second display part to display another part of the predetermined video when the first display part and the second display part are in the first arrangement; and the video controlling means causes the first display part and the second display part to display different kinds of video, respectively, when the first display part and the second display part are in the second arrangement.

According to the present invention, a control method for a stage apparatus including a plurality of display parts for displaying video and at least one supporting member for supporting the display part includes a position controlling step of controlling a position of the display part such that the plurality of display parts are moved to have a predetermined positional relation with respect to one another.

Further, according to one aspect of the present invention, in the stage apparatus, the supporting member of the stage apparatus extends from a stage to support the display part from a back surface thereof; and the supporting member of the stage apparatus includes a pillar portion, a first joint portion provided at a forward end portion of the pillar portion, for turnably jointing the display part to the pillar portion, and a second joint portion provided at a proximal end portion of the pillar portion, for turnably jointing the pillar portion, the control method further includes a video controlling step of displaying the video in the display part. In the control method, the position controlling step includes: controlling an angle between the pillar portion jointed to the first joint portion and the display part jointed to the first joint portion such that the display part is turned in a first direction with respect to the pillar portion, the angle being calculated based on the position of the display part; controlling an angle between members jointed to the second joint portion such that the pillar portion is turned in a second direction different from the first direction, the angle being calculated based on the position of the display part; controlling the position of the display part such that a first arrangement is achieved, in which a first display part and a second display part among the plurality of display parts are aligned with each other; and controlling the position of the display part such that a second arrangement is achieved, in which the first display part and the second display part are out of alignment, the video controlling step includes: causing the first display part to display one part of predetermined video while causing the second display part to display another part of the predetermined video when the first display part and the second display part are in the first arrangement; and causing the first display part and the second display part to display different kinds of video, respectively, when the first display part and the second display part are in the second arrangement.

DETAILED DESCRIPTION OF THE INVENTION

In the following, an embodiment of the present invention is described in detail with reference to the drawings.

Figure 1:
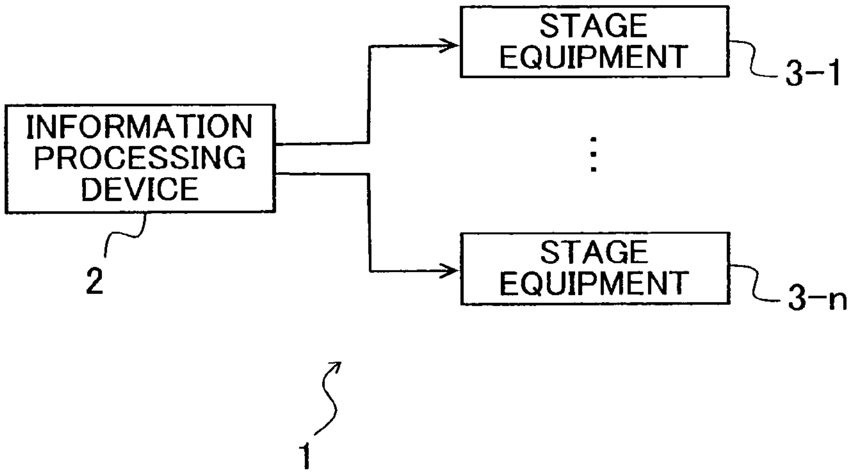
FIG. 1 is a diagram of an example of a configuration of a stage apparatus according to an embodiment of the present invention.

FIG. 1 is a diagram of an example of a configuration of a stage apparatus 1 according to this embodiment. As illustrated in FIG. 1, the stage apparatus 1 according to this embodiment includes an information processing device 2 and multiple pieces of stage equipment 3 (3-1 to 3-*n*). The information processing device 2 and the stage equipment 3 are connected to a network such as a local area network (LAN), and the information processing device 2 and the stage equipment 3 can communicate with each other.

Figure 2:
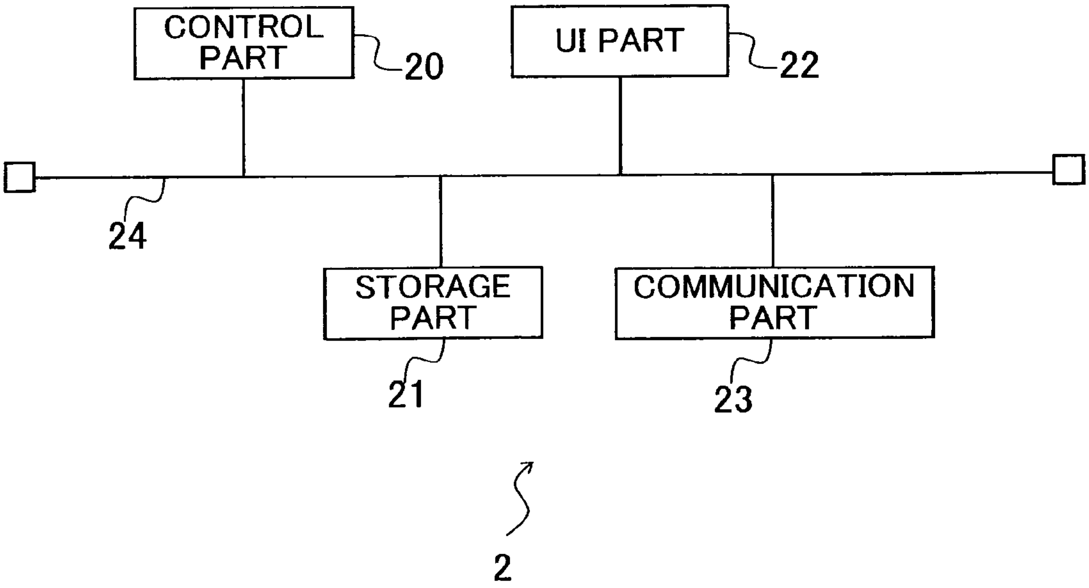
FIG. 2 is a diagram of an example of a hardware configuration of an information processing device according to the embodiment of the present invention.

FIG. 2 is a diagram of an example of a hardware configuration of the information processing device 2 according to this embodiment. As illustrated in FIG. 2, the information processing device 2 according to this embodiment includes a control part 20, a storage part 21, a user interface (UI) part 22, and a communication part 23. The control part 20, the storage part 21, the UI part 22, and the communication part 23 are connected to one another via a bus 24.

The control part 20 is a program control device such as a central processing unit (CPU). The control part 20 operates in accordance with a program installed in the information processing device 2. Note that, this program is provided to the information processing device 2 via an information transmission medium such as a compact disc read only memory (CD-ROM) or digital versatile disc read only memory (DVD-ROM), or via a communication network such as Internet.

The storage part 21 is a storage element such as a random access memory (RAM) or hard disk drive. A program executed by the control part 20 and the like are stored in the storage part 21. Further, the storage part 21 operates as a work memory for the control part 20.

The UI part 22 is a display, microphone, speaker, button, or the like. The UI part 22 outputs, to the control part 20, a content of user's manipulation and audio input by a user. Further, the UI part 22 outputs information in accordance with instructions input from the control part 20 in the form of display or audio.

The communication part 23 is, for example, a network interface card (NIC). The communication part 23 sends information to the stage equipment 3 and the like via the network in accordance with the instructions input from the control part 20. Further, the communication part 23 outputs, to the control part 20, information received via the network.

Figure 3:
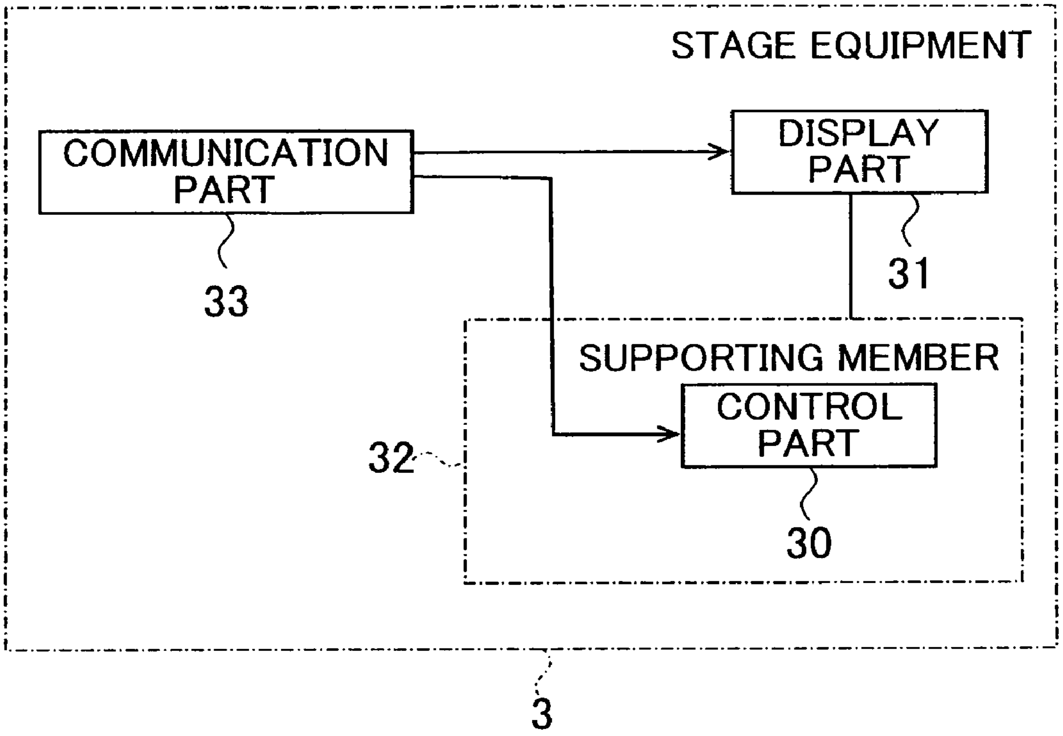
FIG. 3 is a diagram of an example of a configuration of stage equipment according to the embodiment of the present invention.
Figure 4:
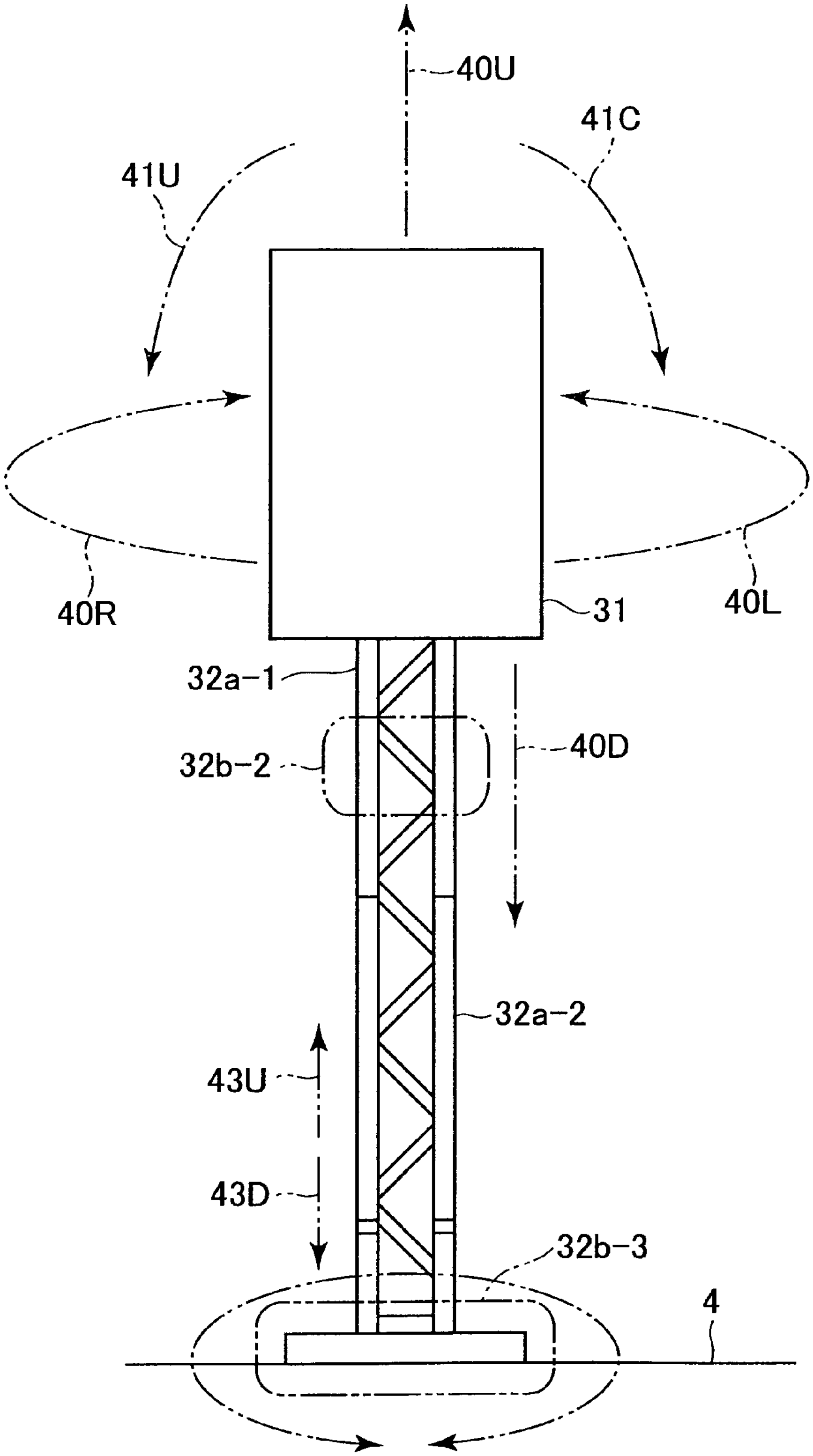
FIG. 4 is a front view of an example of the stage equipment illustrated in FIG. 3.
Figure 5:
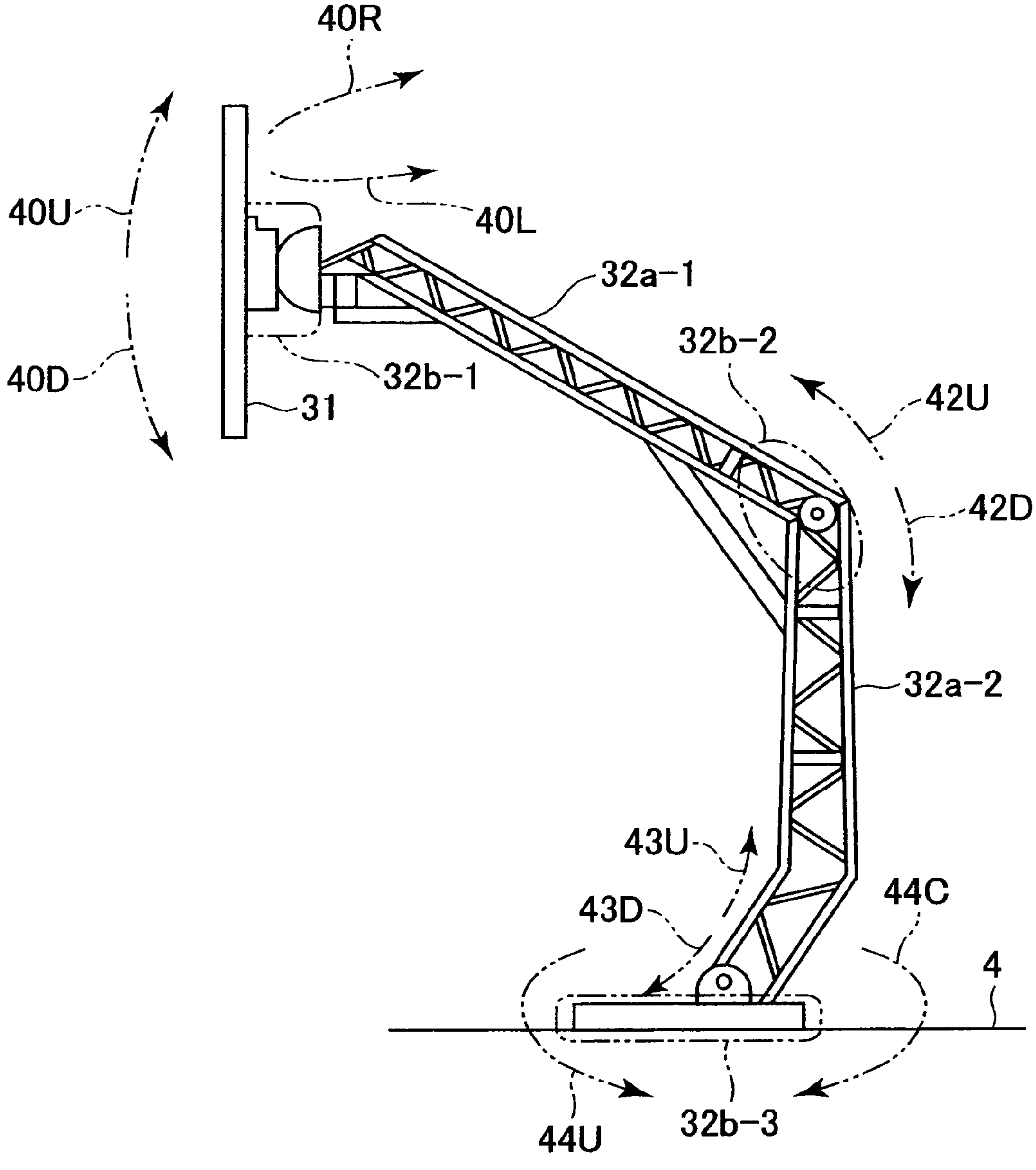
FIG. 5 is a side view of an example of the stage equipment illustrated in FIG. 3.

FIG. 3 is a diagram of an example of a configuration of one piece of the stage equipment 3 according to this embodiment. FIG. 4 is a front view of an example of the stage equipment 3 illustrated in FIG. 3. FIG. 5 is a side view of an example of the stage equipment 3 illustrated in FIG. 3.

As illustrated in FIGS. 3, 4, and 5, each piece of the stage equipment 3 according to this embodiment includes a control part 30, a display part 31, a supporting member 32, and a communication part 33.

The communication part 33 is, for example, a network interface card (NIC). The communication part 33 outputs, to the control part 30 and the display part 31, a signal received via the network.

The display part 31 is, for example, a light emitting diode (LED) or liquid crystal display. The display part 31 generates an image based on the signal and information output from the communication part 33, to thereby display the image. Specifically, for example, when the control part 20 of the information processing device 2 sends data indicating dynamic images (video) to the stage equipment 3, the communication part 33 of the stage equipment 3 receives these data. Further, the communication part 33 of the stage equipment 3 outputs these data to the display part 31. Then, the display part 31 displays dynamic images (video) generated based on the data output from the communication part 33 of the stage equipment 3.

The supporting member 32 is a member for supporting the display part 31. The supporting member 32 is made of, for example, metal, and supports the display part 31 from its back surface. In this embodiment, the supporting member 32 is fixed on a stage 4 by bolts and the like. Further, the supporting member 32 according to this embodiment includes two pillar portions 32*a* having a truss structure (first pillar portion 32*a*-1 and second pillar portion 32*a*-2) and three joint portions 32*b* for turnably jointing members to one another (first joint portion 32*b*-1, second joint portion 32*b*-2, and third joint portion 32*b*-3). The first joint portion 32*b*-1 turnably joints the display part 31 and the first pillar portion 32*a*-1 together. The first pillar portion 32*a*-1 extends from the first joint portion 32*b*-1 to the second joint portion 32*b*-2. The second joint portion 32*b*-2 turnably joints the first pillar portion 32*a*-1 and the second pillar portion 32*a*-2 together. The second pillar portion 32*a*-2 extends from the second joint portion 32*b*-2 to the third joint portion 32*b*-3. The third joint portion 32*b*-3 turnably joints the second pillar portion 32*a*-2 and the stage 4 together. Note that, it is unnecessary that the supporting member 32 be made of metal.

The control part 30 controls a position of the display part 31. In this embodiment, specifically, for example, the control part 30 is configured by an actuator such as a motor and a pneumatic or hydraulic actuator, and a drive circuit or the like for driving the actuator. Note that, the control part 30 may include a microcomputer including a CPU element, a memory element, an I/O element, and the like. Further, in this embodiment, the control part 30 is provided inside one of the joint portions 32*b*, for example.

The control part 20 of the information processing device 2 sends a control signal for controlling the position of the display part 31 (for example, signal which is calculated based on the position or direction in which the display part 31 is to be arranged, and indicates an angle by which each of the joint portions 32*b* is to be turned) to the stage equipment 3 via the communication part 23 of the information processing device 2 and the network. Then, the communication part 33 of the stage equipment 3 outputs the received control signal to the control part 30. The control part 30 performs control of a position of the supporting member 32 (specifically, for example, turning control of joint portions 32*b*). Specifically, turning control of the joint portions 32*b* is realized by using, for example, a well-known actuator control technology and the like. With this configuration, a positional relation among components of the supporting member 32 is changed. Further, with this configuration, the position of the display part 31 is changed. As described above, in this embodiment, the control part 30 controls angles between members jointed by the joint portions 32*b*. Note that, after converting the control signal as a digital signal, which is received by the control part 30, to an analog signal, the control part 30 may perform control of the position of the supporting member 32 based on this analog signal.

In this embodiment, the control part 30 turns the display part 31. Specifically, for example, the control part 30 turns the first joint portion 32*b*-1, to thereby change the orientation of the display part 31 with respect to the first pillar portion 32*a*-1 to an upward direction 40U, a downward direction 40D, a leftward direction 40L, a rightward direction 40R, or the like. Further, the control part 30 turns the first joint portion 32*b*-1, to thereby turn the display part 31 in a clockwise direction 41C or a counterclockwise direction 41U viewed from a viewpoint in front of the stage equipment 3. As described above, the first joint portion 32*b*-1 can be turned about at least two axes.

Further, the control part 30 turns the second joint portion 32*b*-2, to thereby change the orientation of the first pillar portion 32*a*-1 with respect to the second pillar portion 32*a*-2 to an upward direction 42U or a downward direction 42D. Thus, the control part 30 moves the display part 31 in a direction corresponding to a direction perpendicular to a surface of the display part 31. In this way, for example, it can be realized that the display part 31 moves to rise out from the stage 4 toward an auditorium. In this way, it is possible to obtain such a stage effect that the audience can feel that the image and video displayed in the display part 31 are getting closer to the audience impressively.

Further, the control part 30 turns the third joint portion 32*b*-3, to thereby change the orientation of the second pillar portion 32*a*-2 with respect to the stage 4 to an upward direction 43U or a downward direction 43D. Further, in this embodiment, the third joint portion 32*b*-3 turnably joints the second pillar portion 32*a*-2 and the stage 4 together while using a direction perpendicular to the stage 4 as an axis. Further, the control part 30 turns the joint portion 32*b*-3, to thereby turn the stage equipment 3 in a clockwise direction 44C or a counterclockwise direction 44U viewed from a viewpoint in front of the stage equipment 3. As described above, in this embodiment, the third joint portion 32*b*-3 can be turned about at least two axes.

As described above, in this embodiment, the control part 30 can turn the joint portions 32*b* at predetermined timing. Therefore, the control part 30 can variously change the positions of the supporting member 32 and the display part 31 with passage of time. Thus, in this embodiment, it is possible to increase a degree of freedom in terms of movement of the display part 31. Therefore, in this embodiment, it is possible to diversify stage presentation in which the display part 31 is utilized.

Note that, a coupling relation among the pillar portions 32*a* and the joint portions 32*b* included in the supporting member 32 is not limited to the above-mentioned embodiment. Further, the joint portions 32*b* may be turned about an axis different from the above-mentioned axes. For example, the control part 30 may turn the second joint portion 32*b*-2, to thereby change the orientation in the rightward and leftward directions of the first pillar portion 32*a*-1 with respect to the second pillar portion 32*a*-2. Further, a degree of freedom in turning of the joint portions 32*b* is not limited to the above-mentioned embodiment. Further, the above-mentioned turning control is merely an example of control by the control part 30, and the control part 30 may perform control different from the above-mentioned control. Further, it is unnecessary that the control part 30 perform all kinds of the above-mentioned control.

Figure 6:
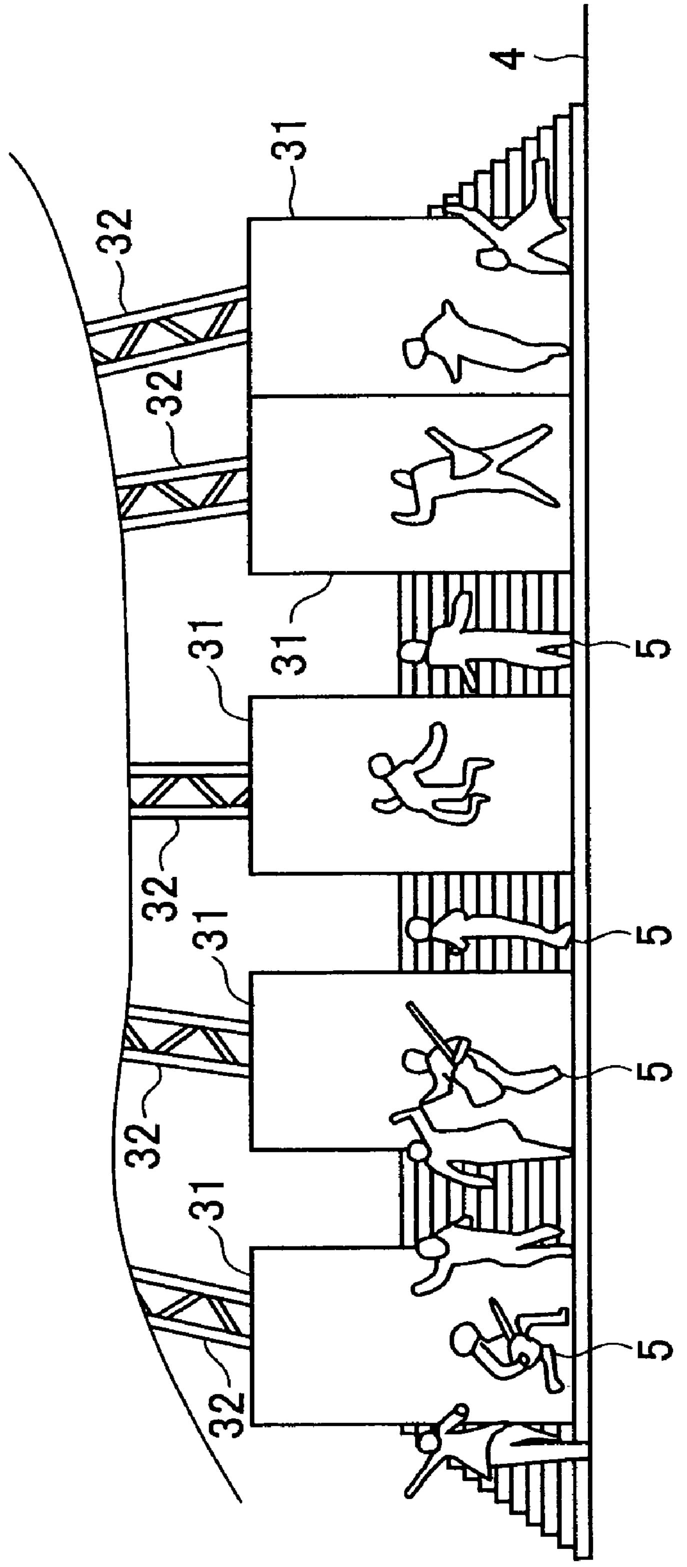
FIG. 6 is a view illustrating an example of a state in which five pieces of the stage equipment according to the embodiment of the present invention are arranged on a stage.
Figure 7:
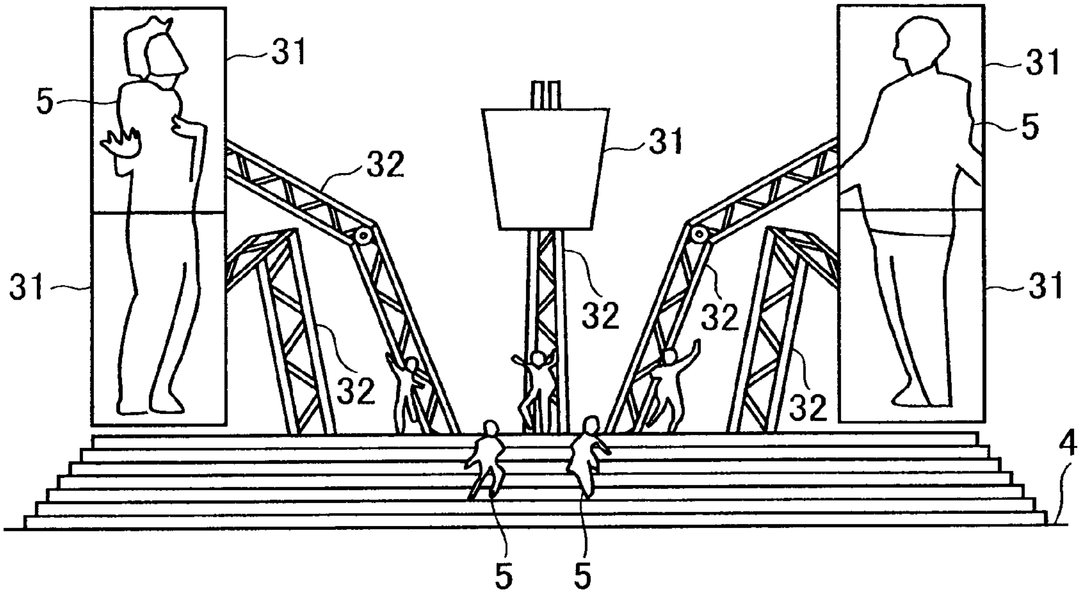
FIG. 7 is a view illustrating another example of the state in which five pieces of the stage equipment according to the embodiment of the present invention are arranged on the stage.
Figure 8:
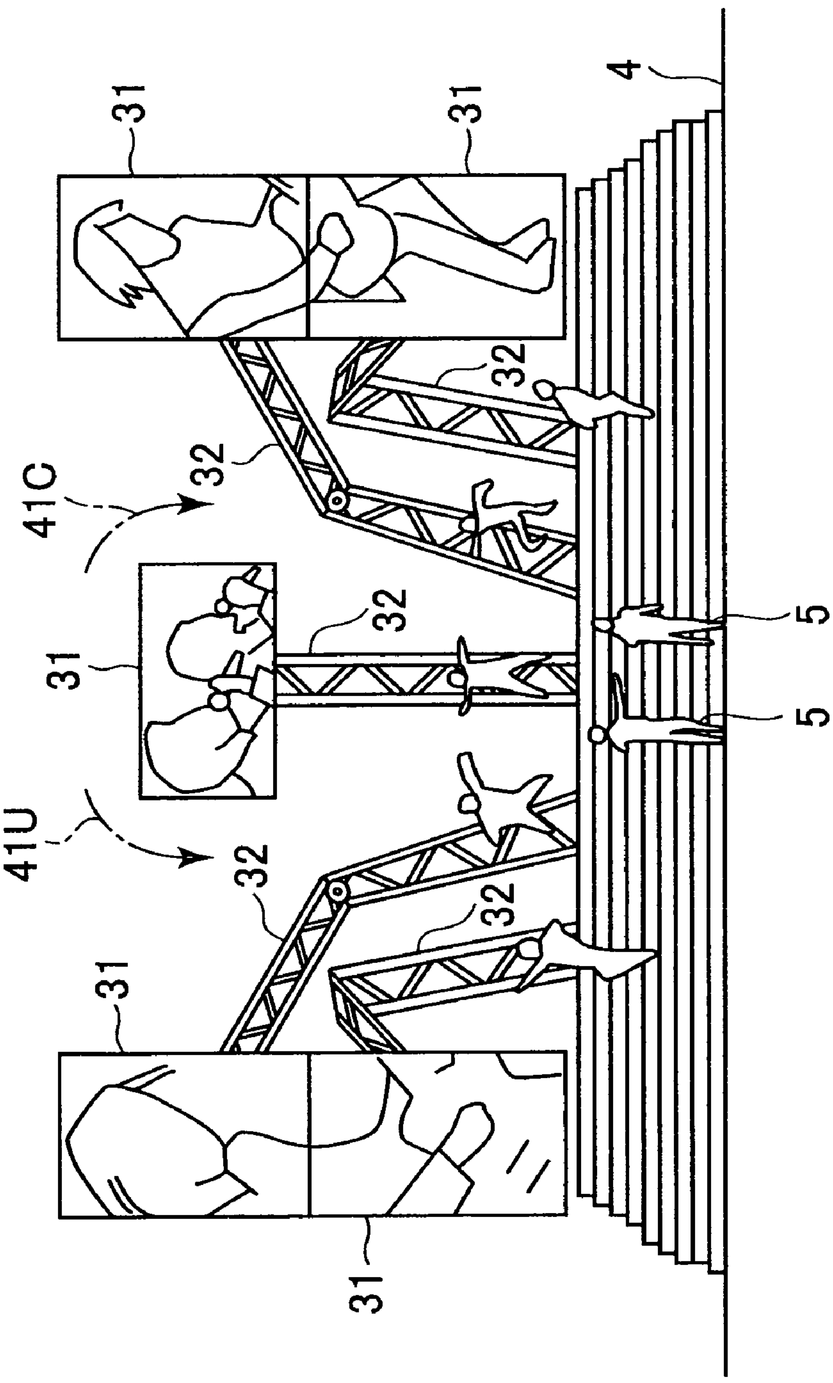
FIG. 8 is a view illustrating still another example of the state in which five pieces of the stage equipment according to the embodiment of the present invention are arranged on the stage.

FIGS. 6, 7, and 8 are views each illustrating an example of a state in which five pieces of the stage equipment 3 according to this embodiment are arranged on the stage 4 on which performing arts including a concert is held. Note that, the number of the stage equipment 3 arranged on the stage 4 is not limited to five. As illustrated in FIGS. 6, 7, and 8, in the stage apparatus 1 according to this embodiment, the supporting members 32 and the display parts 31 correspond to each other in terms of numbers. Specifically, both the number of the supporting members 32 and the number of the display parts 31 are five. Further, one ends of the supporting members 32 are jointed to the display parts 31 corresponding to the supporting members 32, respectively, and the other ends of the supporting members 32 are jointed to the stage 4.

As illustrated in FIG. 6, in this embodiment, for example, the control parts 30 can lower the display parts 31 up to the vicinity of the stage 4. Further, for example, while performers 5 (for example, singers) are singing on the stage 4, the control part 20 of the information processing device 2 can output video of another performers 5 (for example, players) taken by cameras (not shown) to the display parts 31. In this way, it is possible to realize such a stage effect that the plurality of performers 5 perform together on the stage.

Further, as illustrated in FIG. 7, the control parts 30 can control the positions of the display parts 31 such that the plurality of display parts 31 are aligned in a longitudinal direction (height direction). Further, the control part 20 of the information processing device 2 may cause the display parts 31 arranged on an upper side to display one part of video of the performers 5 (for example, singers) singing on the stage 4 (for example, video of upper halves of performers 5), and cause the display parts 31 arranged on a lower side to display the other part of video of the performers 5 (for example, singers) singing on the stage 4 (for example, video of lower halves of performers 5). In this way, it is possible to realize such a stage effect that the audience who is away from the stage 4 can enjoy seeing the singers who are projected in close up in the display parts 31 singing. As described above, the control parts 30 may control a position of at least one display part 31 such that the plurality of display parts 31 are aligned in a line. (As a matter of course, the plurality of display parts 31 may be aligned in a lateral line.)

Further, as illustrated in FIG. 8, one of the control parts 30 turns the display part 31 clockwise or counterclockwise. As a result, it is possible to display, in the center display part 31, a state in which the laterally aligning singers are singing.

As described above, the control parts 30 control the positions of the display parts 31 such that the plurality of display parts 31 are moved to have a predetermined positional relation with respect to one another. In this way, it is possible to realize a stage effect, such as the above-mentioned one, which has been difficult to realize conventionally.

Further, for example, while the concert is held, a user (director, operator, etc.) may operate the UI part 22 of the information processing device 2. Further, the control part 20 of the information processing device 2 may obtain from the UI part 22 an operation signal input by a user, to thereby generate a control signal indicating the position of the display part 31 based on this operation signal. Further, based on this operation signal, the control part 20 of the information processing device 2 generates, for example, a control signal indicating an angle by which each of the joint portions **32*b* is to be turned, to thereby output the control signal to the stage equipment 3. Further, the control part 30 of the stage equipment 3 receives this control signal, to thereby control the position of the supporting member 32 or the display part 31 based on this control signal. In this way, the control part 30 may receive operation performed by a user, to thereby perform control of the position of the display part 31 in accordance with this operation. Thus, it is possible to realize control of the position of the display part 31** in accordance with timing of operation performed by a director or operator.

Note that, the present invention is not limited to the above-mentioned embodiment.

Figure 9:
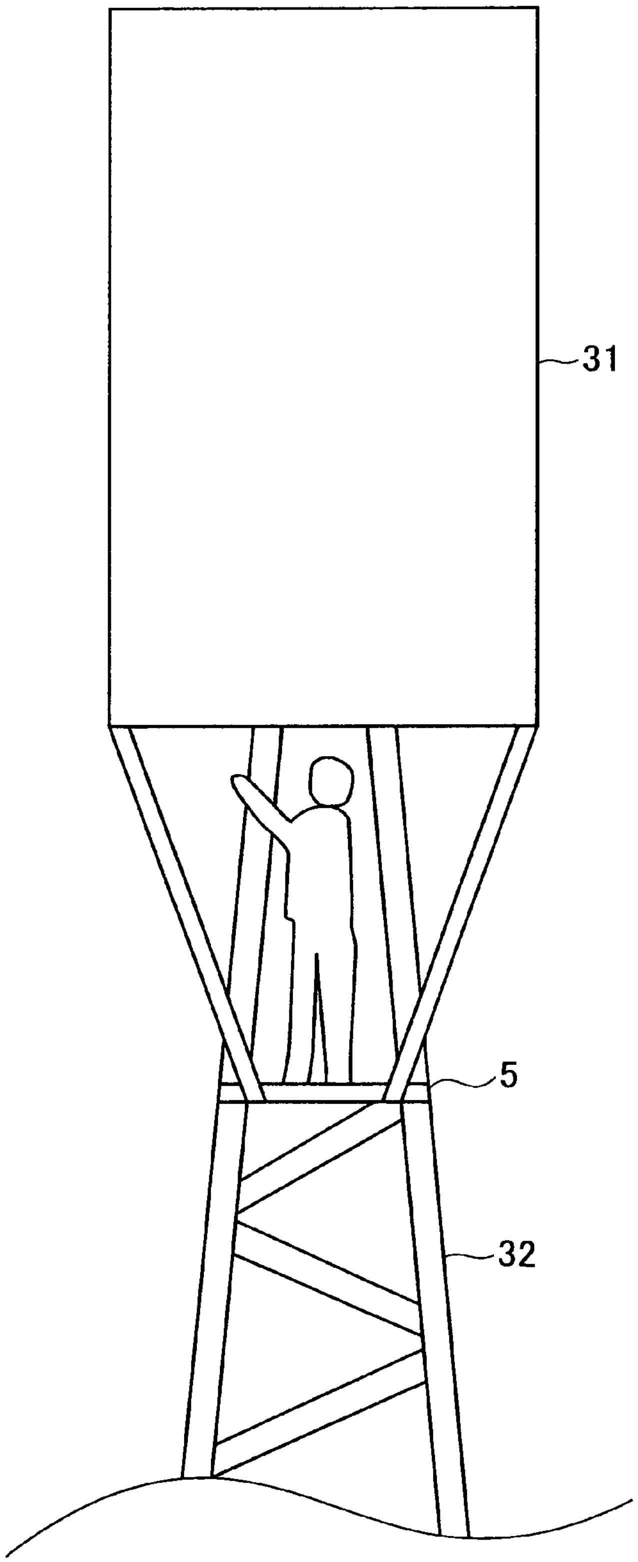
FIG. 9 is a view of an example of the stage equipment to which a scaffold according to the embodiment of the present invention is jointed.

For example, as illustrated in FIG. 9, a platform (for example, scaffold 6) allowing the performers 5 for performing arts (for example, concert) to get on and off is jointed to the display part 31, the stage apparatus 1 being used for the performing arts. Note that, instead of the scaffold 6, a chair, gondola, or the like allowing the performers 5 to get on and off may be jointed to the display part 31.

Further, for example, the control part 20 of the information processing device 2 may collectively perform control of the positions of the plurality of display parts 31, and each of the control parts 30 of the stage equipment 3 may perform control of the position of each of the display parts 31.

Further, for example, by causing the control part 20 of the information processing device 2 to execute a control program installed in advance in the information processing device 2, the control part 20 may output a signal indicating an angle by which each of the joint portions **32*b* is turned at each instant of time to, for example, each of the control parts 30 of the stage equipment 3, to thereby perform control of the position of the display part 31. Further, by causing each of the control parts 30 of the stage equipment 3 to execute a control program installed in advance in a storage device such as a memory provided to the stage equipment 3, each of the control parts 30 may control a turning angle of each of the joint portions 32*b* at each instant of time and the like, to thereby perform control of the position of the display part 31**.

Further, for example, the multiple pieces of the stage equipment 3 may be arranged on the stage 4 so as to be aligned in a line in an edge direction of the stage 4. Further, for example, the multiple pieces of the stage equipment 3 may be arranged on the stage 4 so as to be aligned along an arc convex toward the front of the stage 4.

Further, for example, a plastic-tube supporting member 32 may support the display part 31. Further, the control part 30 may control the position of the display part 31 by controlling a curvature or the like of the supporting members 32.

Figure 10:
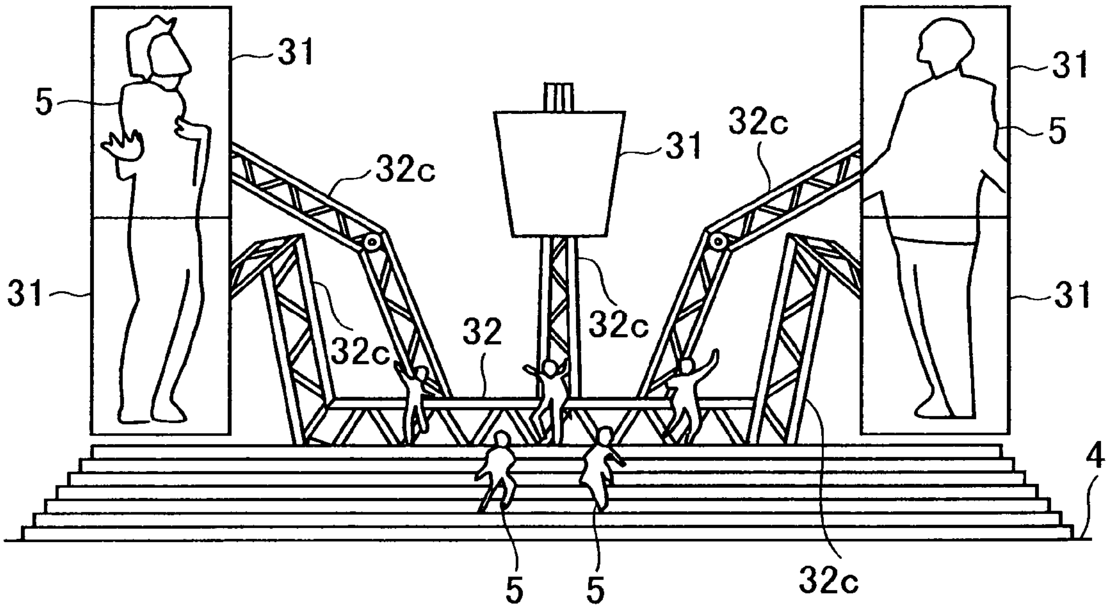
FIG. 10 is a view illustrating an example of a state in which stage equipment according to another embodiment of the present invention is arranged on the stage.

Further, as illustrated in FIG. 10, one branched supporting member 32 may support the plurality of display parts 31. Further, branches **32*c* may respectively support the display parts 31** different from each other.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A stage apparatus, comprising:

a plurality of display parts for displaying video;

at least one supporting member for supporting the display part;

a position controlling means for controlling a position of the display part such that the plurality of display parts are moved to have a predetermined positional relation with respect to one another; and a video controlling means for displaying the video in the display part;

wherein:

the at least one supporting member extends from the stage to support the display part from a back surface thereof, the supporting member comprising:

a pillar portion;

a first joint portion provided at an end portion of the pillar portion, for turnably jointing the display part to the pillar portion; and a second joint portion provided at a proximal end portion of the pillar portion, for turnably jointing the pillar portion;

wherein:

the position controlling means controls an angle between the pillar portion jointed to the first joint portion and the display part jointed to the first joint portion such that the display part is turned in a first direction with respect to the pillar portion, the angle being calculated based on the position of the display part;

the position controlling means controls an angle between members jointed to the second joint portion such that the pillar portion is turned in a second direction different from the first direction, the angle being calculated based on the position of the display part;

the position controlling means controls the position of the display part such that a first arrangement is achieved, in which a first display part and a second display part among the plurality of display parts are aligned with each other;

the position controlling means controls the position of the display part such that a second arrangement is achieved, in which the first display part and the second display part are out of alignment;

the video controlling means causes the first display part to display one part of predetermined video while causing the second display part to display another part of the predetermined video when the first display part and the second display part are in the first arrangement; and the video controlling means causes the first display part and the second display part to display different kinds of video, respectively, when the first display part and the second display part are in the second arrangement.

2. A stage apparatus according to claim 1, wherein, when a receiving operation is performed by a user, the position controlling means controls the position of the display part in accordance with the receiving operation.

3. A stage apparatus according to claim 1, wherein the position controlling means turns the display part.

4. A stage apparatus according to claim 1, wherein the position controlling means moves the display part in a direction corresponding to a direction perpendicular to a surface of the display part.

5. A stage apparatus according to claim 1, wherein:

the at least one supporting member and the plurality of display parts correspond to each other in terms of numbers; and in the at least one supporting member, one end of the supporting member is jointed to the display part corresponding to the supporting member, and another end of the supporting member is jointed to a stage.

6. A stage apparatus according to claim 1, wherein a platform allowing a performer for performing arts to get on and off is jointed to the display part, the stage apparatus being used in the performing arts.

7. A control method for a stage apparatus comprising a plurality of display parts for displaying video and at least one supporting member for supporting the display part, the control method comprising:

a position controlling step of controlling a position of the display part such that the plurality of display parts are moved to have a predetermined positional relation with respect to one another, the stage apparatus being configured such that the supporting member of the stage apparatus extends from a stage to support the display part from a back surface thereof, the supporting member of the stage apparatus comprising:

a pillar portion, a first joint portion provided at a forward end portion of the pillar portion, for turnably jointing the display part to the pillar portion, and a second joint portion provided at a proximal end portion of the pillar portion, for turnably jointing the pillar portion;

a video controlling step of displaying the video in the display part, the position controlling step further comprising:

controlling an angle between the pillar portion jointed to the first joint portion and the display part jointed to the first joint portion such that the display part is turned in a first direction with respect to the pillar portion, the angle being calculated based on the position of the display part, controlling an angle between members jointed to the second joint portion such that the pillar portion is turned in a second direction different from the first direction, the angle being calculated based on the position of the display part;

controlling the position of the display part such that a first arrangement is achieved, in which a first display part and a second display part among the plurality of display parts are aligned with each other; and controlling the position of the display part such that a second arrangement is achieved, in which the first display part and the second display part are out of alignment, the video controlling step further comprising:

causing the first display part to display one part of predetermined video while causing the second display part to display another part of the predetermined video when the first display part and the second display part are in the first arrangement; and causing the first display part and the second display part to display different kinds of video, respectively, when the first display part and the second display part are in the second arrangement.

* * * * *